(No Model.)

H. PACKER.
CORN SHELLER.

No. 263,804. Patented Sept. 5, 1882.

Witnesses:
Phil C. Dieterich
T. S. Smith

Inventor:
Harvey Packer
By Manahan & Ward
Attorneys

UNITED STATES PATENT OFFICE.

HARVEY PACKER, OF ROCK FALLS, ILLINOIS.

CORN-SHELLER.

SPECIFICATION forming part of Letters Patent No. 263,804, dated September 5, 1882.

Application filed August 1, 1882. (No model.)

*To all whom it may concern:*

Be it known that I, HARVEY PACKER, a citizen of the United States, residing at Rock Falls, in the county of Whiteside and State of Illinois, have invented certain new and useful Improvements in Corn-Shellers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has more special reference to what is known as "power-shellers," although also applicable and advantageous to any sheller which separates the shelled corn from the silks, husks, cobs, and other refuse.

My invention relates to a chain of peculiar construction and location, adapted to be used in the double capacity of a sieve and a carrier, the purpose being to separate or screen the shelled corn.

As the construction and relation of the different parts of my improved sheller are shown in my application for a patent on other parts of such sheller, filed May 9, 1882, No. 60,826, and to which reference is here made, I do not deem it essential to herein show or describe any more of such sheller than is necessary to render intelligible the construction, location, and uses of such chain.

Figure 1:
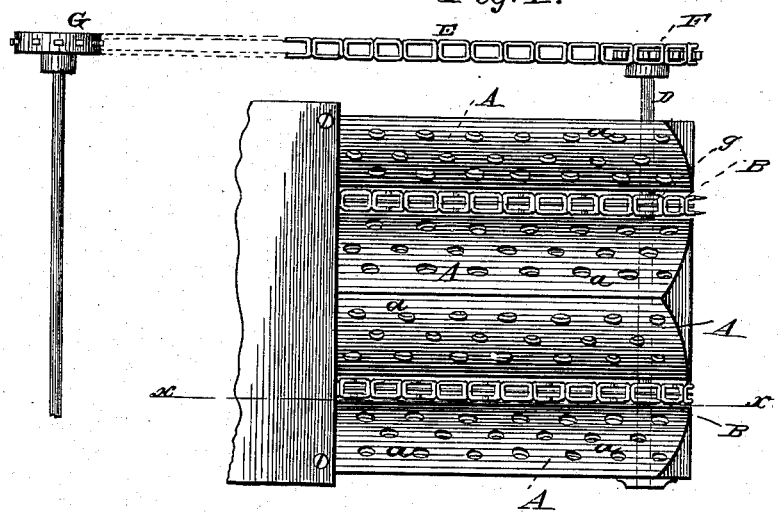
Figure 2:
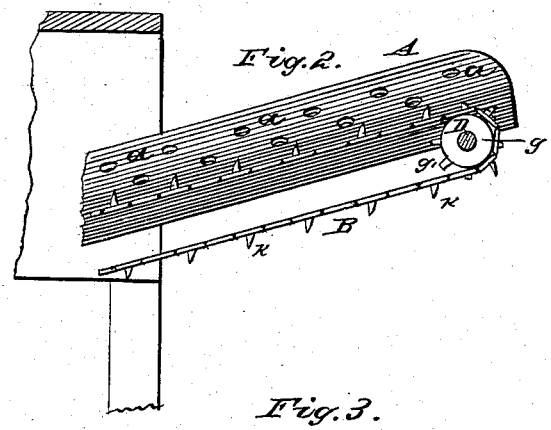
Figure 3:
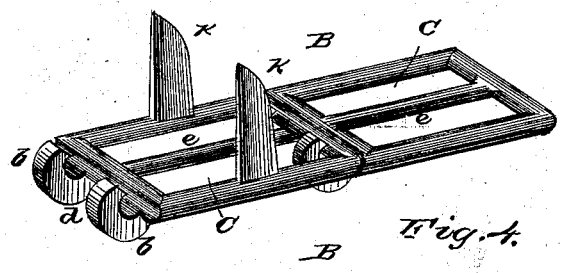
Figure 4:
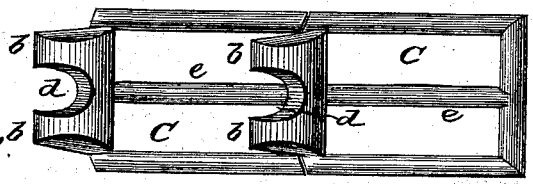

In the drawings, Figure 1 is a plan view of the upper end of a separator embodying my invention. Fig. 2 is a sectional elevation of same in the line *x x* of Fig. 1. Fig. 3 is a perspective view of a portion of the chain B. Fig. 4 is a bottom plan of the same.

As will be seen in Figs. 1 and 2, the chain B is an endless one, carried on sprocket-pulleys, one of which, *g*, is seen. In the drawings are shown two of such chains B. On each side of each chain B are arranged planes A A, sloping laterally toward such chain. The planes A may or may not have the small perforations *a*, as the chief function of such planes is to deflect upon the chain B the discharge from the shelling devices. Any number of chains B may be used, provided there are two deflecting-planes A to each chain. The outer ends of the planes A and chain B are elevated, as shown in Fig. 2, and the lower ends of such planes and chain extend far enough under the shelling devices to receive the shelled corn, cobs, husks, silks, and other dirt in one conglomerate mass from such shelling mechanism. The purpose of the chain B and planes A is to permit the shelled corn to pass through, and to carry the cobs and other refuse upward and cast them out over the elevated or outward end of such devices. The chain B is revolved longitudinally by means of the sprocket-wheel *g*, which is furnished with spurs *g'*, in pairs, to fit the interstices of such chain. The wheel *g* is rigidly attached to the axle D, and is rotated by a drive-chain, E, which passes over and engages the sprocket-pulley F, the latter being tightly affixed to the axle D. The chain E is actuated by a sprocket-wheel, G, seated firmly on the outer end of the axle of one of the shelling-wheels.

The chain B is constituted of open links C, joined together on the same plane by means of the hooks *b b*, formed on the end of each link, and which engage the adjacent end bar of the next succeeding link. The interior space of each link is divided by the longitudinal bar *e*. The bar *e* is necessary in order that while using a chain of sufficient size to do the work the opening in such chain, while sufficiently large to permit the passage of the shelled corn, may not be so large as to allow pieces of cobs and heavy dirt to pass through, such material being too heavy for the blast to expel, unless such blast were so strong that it would also expel the shelled corn.

To enable the chain B to pass and partially fold over the carrying sprocket-wheels, I provide a slot or recess, *d*, between the hooks *b b*, into which the bar *e* of the next succeeding link C readily passes, and thereby the chain B is rendered sufficiently flexible to pass around its carrying-wheels. The slots *d* may be dispensed with by crooking the bars *e*.

As part of the function of the chain B is to carry the cobs and heavier refuse upward and discharge the same at the upper end of the separator, about every third or fourth link C is furnished with upward-projecting spurs *k k*, which insert themselves among such cobs and refuse and prevent the same from slipping backward on the chain.

In the process of shelling corn the intermingled silks and small pieces of husk, often damp, and therefore adhesive and pliable, are driven with great force into the openings of the screen, and are so likely to fill such openings and "choke the screen," as it is called, that heretofore no device has been put in use which satisfactorily performed the work of screening the corn under all conditions. No information in the premises could be had from machines for thrashing small grain, because the conditions so differed. In the one case the proportion of grain was small, the refuse— i. e., straw and chaff—dry, light, and easily blown out. In the corn-sheller the proportion of shelled corn was so great as to tend to carry with it into the holes of the screen the intermingled silks and husks. Through a clogged screen the corn could not pass, and the only remedy, and that but temporary, was to clear the screen of its impeding rubbish by hand. This necessarily forced much of the dirt through the screen.

My device herein described has been tried for some time in machines which can shell over a hundred bushels an hour, and has thoroughly and satisfactorily performed the task allotted it.

The advantage of a longitudinally-rotating chain as a screening-surface is that the chain is continually drawing away from under the heavy discharge from the shelling devices, thus presenting successively a new surface to such discharge, so that an accumulation is not allowed to gather at any one place on the screening-surface; secondly, the chain during half of its transit is inverted and any adhering matter thereby dislodged.

The longitudinal median bar e has two functions—first, to strengthen the chain in the line of its length, and, second, to form openings in the links C of the proper size for sifting or separating the shelled corn.

What I claim as my invention, and desire to secure by Letters Patent of the United States, is—

1. In combination with the shelling devices of a corn-sheller, a chain, B, composed of flat links C, constructed with longitudinal median bars e, and means for causing such chain to revolve longitudinally, substantially as shown, and for the purpose described.

2. In combination with the carrying-pulleys, the chain B, composed of open flat links, constructed with the bars e and slots d, whereby such chain is rendered flexible, substantially as shown, and for the purpose mentioned.

In testimony whereof I affix my signature in presence of two witnesses.

HARVEY PACKER.

Witnesses:
THOS. T. DAVIS,
C. N. MUNSON.